US010559888B2

(12) United States Patent
Jackson et al.

(10) Patent No.: US 10,559,888 B2
(45) Date of Patent: Feb. 11, 2020

(54) SATELLITE GROUND TERMINAL UTILIZING FREQUENCY-SELECTIVE SURFACE DIPLEXER

(71) Applicant: Hughes Network Systems, LLC, Germantown, MD (US)

(72) Inventors: Thomas Jackson, Germantown, MD (US); Peter Hou, Germantown, MD (US)

(73) Assignee: HUGHES NETWORK SYSTEMS, LLC, Germantown, MD (US)

(*) Notice: Subject to any disclaimer, the term of this patent is extended or adjusted under 35 U.S.C. 154(b) by 589 days.

(21) Appl. No.: 15/185,515

(22) Filed: Jun. 17, 2016

(65) Prior Publication Data

US 2016/0372838 A1 Dec. 22, 2016

Related U.S. Application Data

(60) Provisional application No. 62/182,380, filed on Jun. 19, 2015.

(51) Int. Cl.
H01Q 5/50 (2015.01)
H01Q 15/00 (2006.01)
(Continued)

(52) U.S. Cl.
CPC ............ H01Q 19/13 (2013.01); H01Q 1/48 (2013.01); H01Q 5/55 (2015.01);
(Continued)

(58) Field of Classification Search
CPC .... H01Q 5/50; H01Q 15/0033; H01Q 15/002; H01Q 5/314; H01Q 19/19; H01Q 19/13;
(Continued)

(56) References Cited

U.S. PATENT DOCUMENTS 4,342,036 A 7/1982 Scott
5,373,302 A 12/1994 Wu
(Continued)

FOREIGN PATENT DOCUMENTS

EP 0689264 12/1995
EP 1083626 3/2001
WO 2002/073740 9/2002

OTHER PUBLICATIONS

International Search Report and the Written Opinion for International App No. PCT/US2016/038188 dated Sep. 20, 2016, Authorized Officer: Dubret, Francoise.
Derneryd A et al: "Dichroic Antenna Reflector for Space Applications", Ericsson Review (Incl. On), Telefonaktiebolaget, vol. 68, No. 2, Jan. 1, 1991, pp. 22-33.
(Continued)

Primary Examiner — Graham P Smith
Assistant Examiner — Jae K Kim
(74) Attorney, Agent, or Firm — Sheppard, Mullin, Richter & Hampton LLP

(57) ABSTRACT

Systems and methods are provided for separating the uplink signal from the downlink signal in a satellite communication system. A communication terminal for satellite communications is provided, comprising a reflector having a prime focus; a first feed located at the prime focus of the reflector and in optical communication with the reflector; a frequency-selective surface module having a reflected focus and located at a point along a communication path between the main reflector and the first feed; and a second feed located at the reflected focus of the frequency-selective surface module and in optical communication with the frequency-selective surface module.

12 Claims, 3 Drawing Sheets

(51) Int. Cl.
  *H01Q 1/24* (2006.01)
  *H01Q 19/13* (2006.01)
  *H01Q 5/55* (2015.01)
  *H01Q 1/48* (2006.01)
  *H04B 7/185* (2006.01)
  *H04W 72/04* (2009.01)

(52) U.S. Cl.
  CPC ....... *H04B 7/18513* (2013.01); *H04W 72/042* (2013.01); *H04W 72/0413* (2013.01)

(58) Field of Classification Search
  CPC .. H01Q 19/247; H01Q 1/247; H04B 7/18528; H04B 7/18517; H04B 7/18513; H04B 1/0057
  See application file for complete search history.

(56) References Cited

U.S. PATENT DOCUMENTS

| | | | |
|---|---|---|---|
| 7,982,687 B1* | 7/2011 | Santoru | H01Q 19/195 343/776 |
| 2003/0234745 A1* | 12/2003 | Choung | H01Q 19/192 343/781 P |
| 2015/0200701 A1 | 7/2015 | Stave | |
| 2016/0372838 A1 | 12/2016 | Jackson | |

OTHER PUBLICATIONS

International Search Report and Written Opinion for PCT/US2018/034960, dated Aug. 14, 2018, 15 pages.

\* cited by examiner

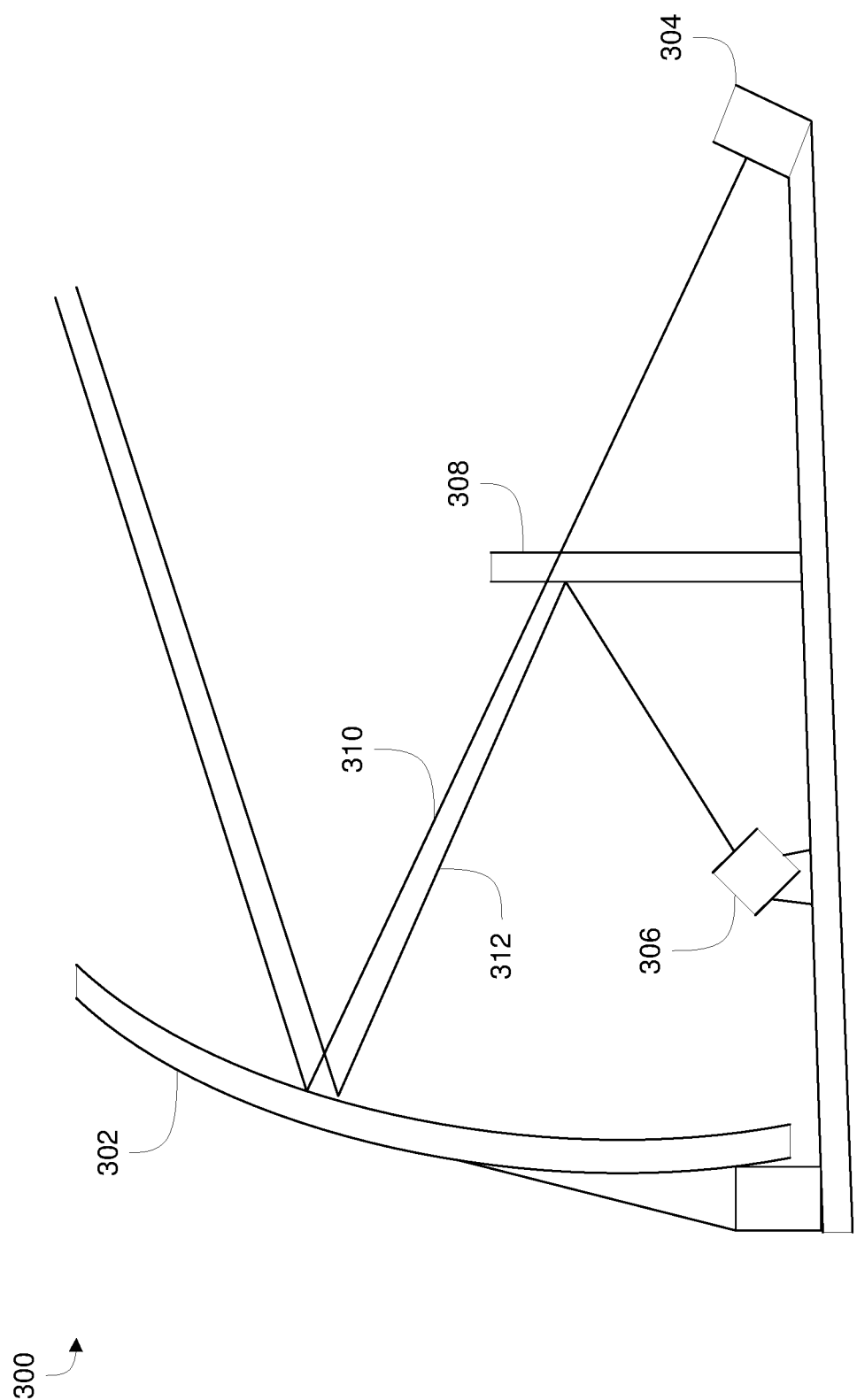

SATELLITE GROUND TERMINAL UTILIZING FREQUENCY-SELECTIVE SURFACE DIPLEXER

CROSS-REFERENCE TO RELATED APPLICATIONS

This application claims priority to U.S. Provisional Patent Application 62/182,380, filed Jun. 19, 2015.

TECHNICAL FIELD

The disclosed technology relates generally to satellite ground terminals, and more particularly, some embodiments relate to satellite ground terminals utilizing a frequency-selective surface module as a frequency diplexer.

DESCRIPTION OF THE RELATED ART

Satellite ground terminals, such as the very small aperture terminal (VSAT), enable duplex communication within a communication network via a single reflector antenna system. The data signal transmitted from the VSAT to the satellite is called the uplink signal, and the data signal received by the VSAT from the satellite is called the downlink signal. Traditionally, the VSAT 100 is feed fed, meaning that a transceiver module 102 with a feed horn antenna located at the focal point of the reflector dish 104 of the VSAT 100 radiates the reflector dish, as illustrated in FIG. 1. The reflector dish 104 focuses the downlink signal 106 from the satellite to the feed horn of the transceiver module 102. For the uplink signal 108, the reflector dish transforms a spherical uplink signal radiated by the feed horn antenna of the transceiver module into a planar uplink signal for transmission to the satellite.

A single feed horn antenna is configured to receive and transmit both uplink and downlink signals over a particular band of frequencies, such as $K_a$ band, $K_u$ band, C, or other frequency bands. The design of the feed horn antenna must account for the differences between the uplink communication path and the downlink communication path. A balance must be struck between the gain requirements of the downlink path and the specific envelope standards for the uplink signal dictated by governmental regulations, such as those promulgated by the FCC.

It is necessary to separate the uplink signal from the downlink signal conveyed by the feed horn antenna. In order to separate the two signals, several waveguide devices are attached to the feed horn antenna. Each signal travels at slightly different frequencies within a specific frequency band. For example, some satellite communication occurs over the 30/20 GHz band, with the uplink signal at 30 GHz and the downlink signal at 20 GHz. The waveguide components act to separate the signals and transfer each separate signal to the correct processing circuitry for each communication path. Such separation is necessary to protect the low-power downlink side components from the high-power uplink signal.

The waveguide components are machined from metals, such as copper, aluminum, brass, and zinc, adding extra weight to the system that must be supported by the mast of the VSAT. In addition, it is expensive to machine the different waveguide devices, such as the orthomode transducer, due to the high precision necessary to achieve operational requirements.

BRIEF SUMMARY OF EMBODIMENTS

According to various embodiments of the disclosed technology, a system and method are provided for conducting duplex satellite communication using a single VSAT without the need for expensive and heavy waveguide devices attached to the antenna. A frequency-selective surface module including a frequency-selective surface placed within the optical path between the reflector and the focal point of the reflector acts as a frequency diplexer to separate the uplink from the downlink signal. In addition, by separating the two signals earlier in the optical path, the components of the transmit communication path and the receive communication path may be independently located within the VSAT. This enables optimization of the feed horn antenna and other components connected to each separate communication path, eliminating the need to trade-off between efficiency and isolation as required when both communication paths are co-located.

According to various embodiments of the disclosed technology, a method of performing two-way satellite communication using a single antenna is provided, comprising transmitting a carrier signal using a reflector to a frequency-selective surface module located within an optical path between the reflector and a prime focus of the reflector; passing a first signal within a first frequency range through the frequency-selective surface module such that a first feed located at the prime focus of the reflector is in optical communication with the reflector; and reflecting a second signal within a second frequency range at the frequency-selective surface module such that a second feed located at a reflected focus of the frequency-selective surface module is in optical communication with the frequency-selective surface module.

According to an embodiment of the disclosed technology, a method of separating two signals is provided, comprising receiving at a frequency-selective surface module a carrier signal from a reflector; passing a first signal within a first frequency range through the frequency-selective surface module such that the first signal continues along an optical path between the reflector and a prime focus of the reflector; and transmitting a second signal within a second frequency range such that the second signal reflects to a reflected focus of the frequency-selective surface module.

According to another embodiment of the disclosed technology, a communication terminal for satellite communications is provided, comprising a reflector having a prime focus; a first feed located at the prime focus of the reflector and in optical communication with the reflector; a frequency-selective surface module having a reflected focus and located at a point along a path of optical communication between the main reflector and the first feed; and a second feed located at the reflected focus of the frequency-selective surface module and in optical communication with the frequency-selective surface module.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3 illustrates a satellite ground terminal utilizing a frequency-selective surface module in accordance with one embodiment of the technology herein disclosed.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward a device and method for duplex satellite communication over a single antenna. More particularly, various embodiments of the technology disclosed herein relate to a satellite ground terminal utilizing a frequency-selective surface module including a frequency-selective surface as a sub-reflector acting as a frequency diplexer to separate the uplink and downlink signals.

Figure 1:
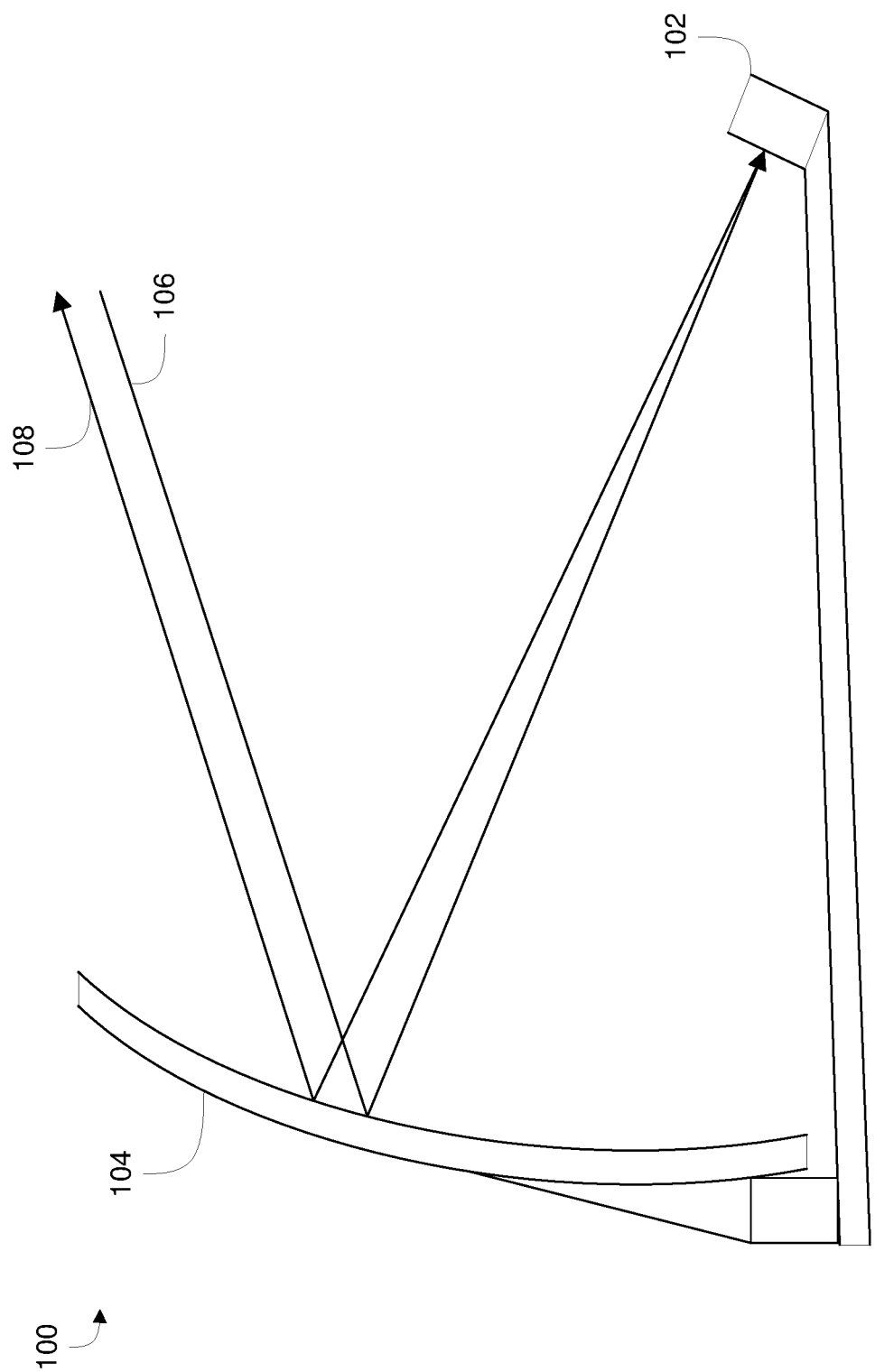
FIG. 1 illustrates an example of a traditional satellite communication terminal.
Figure 2:
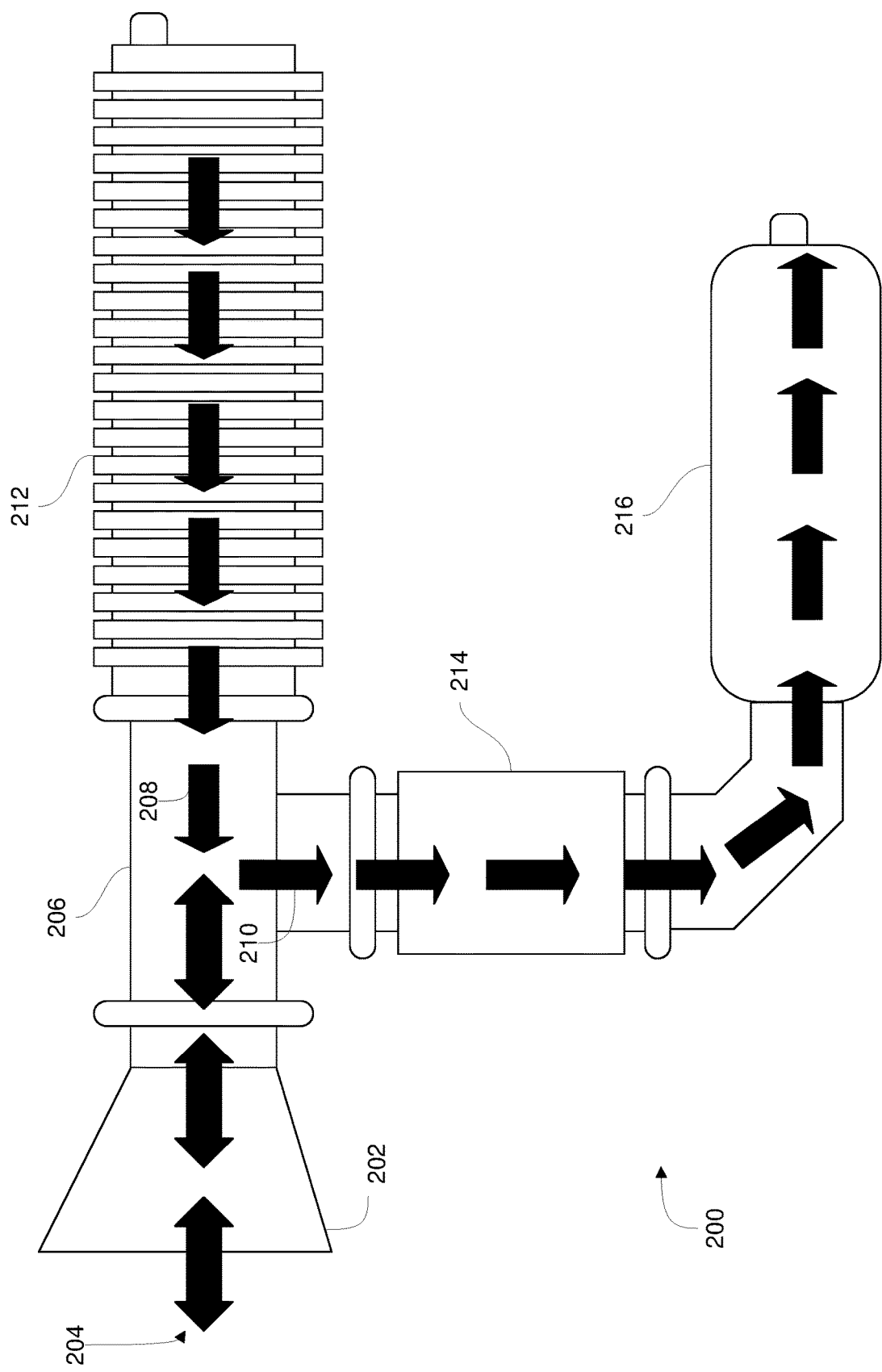
FIG. 2 illustrates an example outdoor unit, and the components thereof, traditionally used in separating the uplink signal and the downlink signal.

As discussed above, it is desirable that the VSAT 100 be able to provide a certain degree of separation between the uplink signal and the downlink signal to avoid an unacceptable level of crosstalk interference and to avoid damage to sensitive receiver components. FIG. 2 illustrates a traditional transceiver module 200 used to separate the uplink and downlink signals in a VSAT, such as the VSAT 100 shown in FIG. 1. Generally, the components of transceiver module 200 is referred to as the outdoor unit (ODU) of the VSAT. A feed horn antenna 202 is positioned at the focal point of a reflector dish and conveys both the uplink signal and the downlink signal over a data signal 204. Attached to the feed horn antenna 202 is an orthomode transducer (OMT) 206. The OMT 206 serves to combine or separate the uplink signal 208 and the downlink signal 210. When implemented in a VSAT, the OMT 206 orthogonally polarizes an uplink signal 208 and downlink signal 210 such that the two signals are at 90° to each other. Orthogonally polarizing the signals allows for greater isolation and decreased interference between the signals. The OMT 206 directs the downlink signal 210 to the downlink signal path.

The uplink signal 208 enters the OMT 206 from a block-up converter (BUC) 212. The BUC 212 converts signals received from a subscriber's indoor unit (IDU) from a lower frequency to a higher frequency. The BUC 212 converts the signal such that it falls within one of the radio spectrum bands identified for satellite communication, such as the $K_u$ band, $K_a$ band, C band, or other radio frequency band.

From the OMT 206, the downlink signal 210 enters a low-noise block (LNB) 216. The LNB 216 combines several different components, such as a low-noise amplifier, local oscillator, and frequency mixer, to convert the downlink signal into a range of intermediate frequencies (IF) for carrying the received signal from the VSAT to the IDU using coaxial cable or other inexpensive connector. In addition to the LNB 216, the downlink path may include additional waveguide elements, such as frequency filter 214.

As discussed above, the traditional ODU components are machined from metals, such as copper, aluminum, brass, and zinc. Each additional component adds weight to the VSAT, which should be taken into consideration in designing the overall VSAT. Machining of the ODU components is also expensive. Precise machining is desired for each waveguide component to meet the operational requirements of the VSAT, based on the material, operating frequencies, and filtering needs.

Further, use of a single feed horn antenna requires design trade-offs between the uplink signal and the downlink signal. For the downlink signal, a higher gain results in greater efficiency in the downlink communication path. For the uplink signal, regulatory rules govern how the uplink signal must operate within the communication band. When using a single feed horn antenna, a trade-off may occasionally be made to sacrifice higher gain to ensure that the uplink signal meets the mandated specifications of the communication band, as outlined by regulatory bodies like the FCC. Separating the components of the two signal paths increases the ability to optimize each signal path individually. Further, such separation also provides complete physical isolation of the two signal paths. This isolation may reduce potential interference between the transmit and receive signals on the different signal paths.

To avoid the need for multiple waveguide devices attached to the VSAT and to allow greater optimization of each communication path independently, a frequency-selective sub-reflector can be used to separate the uplink signal and the downlink signal. FIG. 3 illustrates an example VSAT 300 implementing a frequency-selective surface module in accordance with the present disclosure. The general operation of VSAT 300 is the same as the operation of VSAT 100. VSAT 300 includes a main reflector dish 302, a first feed 304, and a second feed 306. Instead of a single feed horn antenna coupled to both the uplink signal and the downlink signal, the first feed 304 and the second feed 306 each include a separate feed horn antenna. Signal 310 indicates an example signal path between main reflector dish 302 and first feed 304. Likewise, signal 312 indicates a signal path between main reflector dish 302 and second feed 306. In various embodiments, the first feed 304 may be connected to the uplink signal path and the second feed 306 may be connected to the downlink signal path. In other embodiments, the first feed 304 may be connected to the downlink signal path and the second feed 306 may be connected to the uplink signal path. In various embodiments, each feed may include a feed horn antenna designed to optimize its respectively assigned uplink signal path or the downlink signal path.

In various embodiments, separation of the uplink and downlink signals may be achieved using a frequency-selective surface module 308. The frequency-selective surface module 308 can include a support structure such as, for example, a block of material or a plate, and the support structure includes a frequency-selective surface on at least one face thereof. The frequency-selective surface in some embodiments includes periodic metallic patches designed to be transparent to a range of frequencies, but reflective to others. In operation, the in-band frequencies are capable of passing through the frequency-selective surface, without any effect on the in-band frequencies path of propagation, while the out-band frequencies are reflected off of the frequency-selective surface.

The frequency selective surface may be configured to transmit or reflect the RF signals based on their frequency. Accordingly, the frequency-selective surface may be configured to act as a filter, such as a pass-band filter. Which frequencies are capable of passing through the frequency-selective surface and which frequencies are reflected depends on the pattern of metallic or dielectric elements embodied on the frequency-selective surface. In other embodiments, the frequency selective surface can comprise a thin surface such as a metallic or dielectric screen or mesh.

As illustrated in the example of FIG. 3, a frequency-selective surface module 308 can be mounted so that it is positioned within the signal path between the main reflector dish 302 and the first feed 304 located at or near the focal point of the main reflector dish 302. For example, the first feed 304 may be located before or after the focal point of the main reflector dish, as long as the phase center of the feed horn of the first feed 304 is located at the focal point of the main reflector dish. In various embodiments, the frequency-selective surface module 308 may be configured to allow signal 310 to pass through the frequency-selective surface module 308 without materially altering the signal path or attenuating the signal 310. Additionally, the frequency-selective surface module 308 may be configured such that signal 312 is reflected off of the frequency selective surface to direct signal 312 between main reflector dish 302 and second feed 306.

For example, consider an embodiment in which the antenna is configured such that signal 310 is an uplink signal and signal 312 is a downlink signal. In this embodiment, uplink signal 310 emanates from first feed 304, is allowed to pass through frequency-selective surface module 308 and is reflected off main reflector dish 302 for transmission to the satellite. Also in this embodiment, downlink signal 312 from the satellite is reflected off main reflector dish 302 and subsequently reflected off the frequency-selective surface module 308 and directed toward second feed 306.

As another example, consider an embodiment in which the antenna is configured such that signal 310 is a downlink signal and signal 312 is an uplink signal. In this embodiment, uplink signal 312 emanates from second feed 306 is reflected off the frequency-selective surface module 308 and directed toward main reflector dish 302. Main reflector dish 302 directs the uplink signal 312 toward the satellite. Receive signal 310 is reflected by main reflector dish 302 toward first feed 304. Receive signal 310 is allowed to pass through frequency-selective surface module 308 without material attenuation or alteration of its path.

In various embodiments, the frequency-selective surface module 308 may be constructed using a non-conductive or dielectric base onto which conductive (e.g., metallic) elements are placed. In various embodiments, the conductive elements can be placed in a regular or periodic pattern that is dimensioned to allow one signal at a first frequency (e.g. signal 310) to pass through the frequency-selective surface module 308 without materially attenuating the signal or materially altering the signal path. The patterns can be implemented in various frequency-selective patterns such as, for example, strip gratings having a periodic array of conductive strips; resonant structures such as linear, convoluted and crossed dipoles; mesh or cross-mesh patterns; or other suitable patterns or arrangements. In other embodiments, rather than a patterned surface, three-dimensional structures such as, for example, photonic crystals may be used to provide a frequency selective material.

The conductive patterns can be disposed on a surface of the frequency-selective surface module 308 using any of a number of suitable patterning techniques including, for example, printing or screen printing with conductive inks, patterning conductive paints, photolithography processes, and so on. In various embodiments, the metallic traces may be made of conductive materials such as silver, copper, gold or other conductive elements or alloys. In some embodiments, the non-conductive base may be made using reinforced resins and epoxies (e.g. glass or fiberglass reinforced resins and epoxies such as FR-4), phenolics, plastics, glass, fiberglass and others. In yet another embodiment, selective surface module 308 can be fabricated using a sheet material such as a Mylar or Kapton sheet affixed to a solid surface or mounted in a frame, with the conductive materials patterned thereon. In some embodiments, the non-conductive base may be made of silicon, gallium arsenide, silicon dioxide, sapphire, aluminum oxide, or other non-metallic material suitable for use as the substrate of a printed-circuit board (PCB).

The frequency-selective surface module 308 acts as a sub-reflector for a signal to which the module is not transparent. For example, as illustrated in FIG. 3, the frequency-selective surface module 308 can be configured to allow the signal 310 to pass through the module, while signal 312 would reflect off the frequency-selective surface module 308. In this way, the frequency-selective surface module 308 separates the downlink signal 312 from the uplink signal 310 without the need for expensive and heavy waveguide devices. In various embodiments, the frequency-selective surface module 308 may be configured as having a flat surface, while in other embodiments the surface can have a contour such as, for example, a parabolic contoured surface.

In various embodiments, the mounting location of the frequency-selective surface module 308 may be adjustable, to allow for optimal placement of module 308 within the optical path of the main reflector dish 302. In some embodiments, the frequency-selective surface module 308 may be adjustable in the vertical direction, the horizontal direction, the angle at which it is mounted or some combination thereof. In this way, the frequency-selective surface module 308 may be positioned to optimally reflect one signal between main reflector dish 302 and the second feed 306 while still allowing the other signal to pass between the main reflector dish 302 and the first feed 304. In some embodiments, the frequency selective surface module 308 may include a notched support member such that the surface of the frequency-selective surface module 308 may be raised or lowered to ensure that the surface is within the propagation path of the main reflector dish. In some embodiments, the frequency-selective surface module may include a horizontal adjustment support designed to allow the surface of the frequency-selective surface module 308 to be adjusted in the horizontal direction. For example, horizontal adjustment may allow for optimal positioning of the second feed 306 by ensuring that the reflected focus of the frequency-selective surface 308 is at the position of the second feed 306.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment.

Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A very small aperture terminal (VSAT) for a satellite communication system, comprising:
    a reflector having a prime focus;
    a first feed located at the prime focus of the reflector and in optical communication with the reflector;
    a frequency-selective surface module having a reflected focus and located at a point along a communication path between the reflector and the first feed, wherein the frequency-selective surface module is configured to be transparent to a first set of frequencies such that a first signal within the first set of frequencies transmitted on a carrier signal passes through the frequency-selective surface module; and wherein the frequency-selective surface module is configured to be reflective to a second set of frequencies such that a second signal within the second set of frequencies transmitted on a carrier signal is reflected; and
    a second feed located at the reflected focus of the frequency-selective surface module and in optical communication with the frequency-selective surface module, wherein each of the first and second feed is configured to transmit uplink signals within the first set of frequencies or receive downlink signals within the second set of frequencies,
    wherein the frequency-selective surface module comprises a non-metallic base with a plurality of metallic traces embodied thereon, wherein the plurality of metallic traces are arranged in a pattern designed to allow a signal within the first set of frequencies to pass through the frequency-selective surface module, wherein the pattern comprises one or more of: strip gratings having a periodic array of conductive strips, mesh patterns, and cross-mesh patterns, and wherein the frequency-selective surface module comprises a horizontal adjustment support for adjusting a position of a surface of the frequency-selective surface module in a horizontal direction to ensure that the second feed is located at the reflected focus of the frequency-selective surface module.

2. The VSAT of claim 1, wherein:
    the first feed comprises a transmitter chain module and the second feed comprises a receiver chain module; or
    the first feed comprises a receiver chain module and the second feed comprises a transmitter chain module.

3. The VSAT of claim 1, wherein the non-metallic base comprises one or more of: resin, epoxy, plastic, phenolics, glass, fiberglass, silicon, gallium arsenide, silicon dioxide, sapphire, and aluminum oxide.

4. The VSAT of claim 1, wherein the frequency-selective surface module is adjustable in one or more of a vertical direction and an angular direction, wherein the frequency-selective surface module comprises a notched support member such that the surface of the frequency-selective surface module may be raised or lowered to ensure that the surface is within the propagation path of the main reflector dish.

5. The VSAT of claim 1, wherein each of the first feed and the second feed comprises a respective feed horn antenna.

6. A method of performing two-way satellite communication using a single antenna, comprising:
    transmitting a carrier signal from a reflector of a very small aperture terminal (VSAT) to a frequency-selective surface module of the VSAT located within an optical path between the reflector and a prime focus of the reflector;
    passing a first signal within a first frequency range through the frequency-selective surface module such that a first feed of the VSAT located at the prime focus of the reflector is in optical communication with the reflector; and
    reflecting a second signal within a second frequency range at the frequency-selective surface module such that a second feed of the VSAT located at a reflected focus of the frequency-selective surface module is in optical communication with the reflector, wherein the frequency-selective surface module comprises a horizontal adjustment support for adjusting a position of a surface of the frequency-selective surface module in a horizontal direction to ensure that the second feed is located at the reflected focus of the frequency-selective surface module.

7. The method of claim 6, wherein:
    the first feed transmits uplink signals in a satellite communication system and the second feed receives downlink signals in a satellite communication system; or
    the first feed receives downlink signals in a satellite communication system and the second feed transmits uplink signals in a satellite communication system.

8. The method of claim 6, wherein each of the first feed and the second feed comprises a respective feed horn antenna.

9. The method of claim 6, wherein the frequency-selective surface module has a parabolic shape.

10. The method of claim 6, wherein the frequency-selective surface module comprises a non-metallic base with a plurality of metallic traces embodied thereon.

11. The method of claim 10, wherein the plurality of metallic traces are arranged in a pattern designed to allow a signal within the first frequency range to pass through the frequency-selective surface module.

12. The method of claim 11, wherein the pattern comprises one or more of: strip gratings having a periodic array of conductive strips, mesh patterns, and cross-mesh patterns.

* * * * *